(12) United States Patent
Rhodes

(10) Patent No.: US 6,382,139 B1
(45) Date of Patent: May 7, 2002

(54) QUICK RELEASE APPARATUS FOR CONSTRAINED ANIMALS

(76) Inventor: David Meritt Rhodes, 5100 NW. Gainsville Rd., Ocala, FL (US) 34475

(*) Notice: Subject to any disclaimer, the term of this patent is extended or adjusted under 35 U.S.C. 154(b) by 0 days.

(21) Appl. No.: 09/608,605

(22) Filed: Jun. 30, 2000

Related U.S. Application Data (63) Continuation-in-part of application No. 09/167,664, filed on Oct. 7, 1998, now Pat. No. 6,164,048.

(51) Int. Cl.⁷ ............................................. A01K 27/00
(52) U.S. Cl. ...................................................... 119/776
(58) Field of Search ................................ 119/772, 776, 119/783; 54/1, 34

(56) References Cited

U.S. PATENT DOCUMENTS

| | | |
|---|---|---|
| 281,860 A | 7/1883 | Jones |
| 438,360 A | 10/1890 | Phelps |
| 444,387 A | 1/1891 | Harris |
| 577,315 A | 2/1897 | Nichols |
| 794,563 A * | 7/1905 | Stahlknecht ................ 119/776 |
| 934,449 A | 9/1909 | Leech et al. |
| 957,517 A | 5/1910 | Pasley |
| 962,890 A | 6/1910 | Byrd et al. |
| 1,130,049 A | 3/1915 | Welches |
| 1,190,383 A | 7/1916 | Court |
| 1,610,679 A | 12/1926 | Hoadley |
| 2,821,003 A | 1/1958 | Boyes et al. |
| 3,139,863 A | 7/1964 | Steinbach |
| 3,288,112 A | 11/1966 | Welton |
| 3,805,336 A | 4/1974 | Jungersen et al. |
| 3,848,571 A | 11/1974 | Pearson et al. |
| 3,934,848 A | 1/1976 | Snyder .................... 244/151 A |
| 4,149,492 A | 4/1979 | Kovacs |
| 4,267,685 A | 5/1981 | Cragin ............................ 54/1 |
| 4,533,276 A | 8/1985 | Stidham |
| 4,742,605 A | 5/1988 | Ritacco |
| 4,820,094 A | 4/1989 | Hirakui et al. |
| 4,903,638 A | 2/1990 | Lacey |
| 4,909,658 A | 3/1990 | Townsend |
| 5,092,276 A | 3/1992 | Rockhold |
| 5,103,771 A | 4/1992 | Lee |
| 5,125,365 A | 6/1992 | Bonilla |
| 5,161,486 A * | 11/1992 | Brown ........................ 119/795 |
| 5,195,217 A | 3/1993 | Arntzen .................... 24/115 F |
| 5,197,410 A | 3/1993 | Wilson et al. |
| 5,423,164 A | 6/1995 | Schneider .................... 54/44.1 |

FOREIGN PATENT DOCUMENTS

AT 143674 * 11/1935 ................ 119/776

* cited by examiner

Primary Examiner—Robert P. Swiatek
(74) Attorney, Agent, or Firm—Burns, Doane, Swecker & Mathis, L.L.P.

(57) ABSTRACT

An animal constraint, such as a dog leash or horse cross-tie, incorporates a quick release mechanism that is essentially free of any biasing member, pivoting member, or camming-action member. The quick release mechanism is remotely releasable by a trigger member. The dog leash includes a releasable first coupler that can be attached to a dog, and an attached second coupler that can be used to releash a previously-released dog.

19 Claims, 9 Drawing Sheets

QUICK RELEASE APPARATUS FOR CONSTRAINED ANIMALS

RELATED INVENTION

This is a continuation-in-part of U.S. Ser. No. 09/167,664, filed Oct. 7, 1998 and now U.S. Pat. No. 6,164,048 (the description thereof being incorporated by reference herein).

BACKGROUND OF THE INVENTION

1. Field of the Invention

The invention relates to quick release devices for constrained animals. In particular, the invention relates to a quick release mechanism incorporated in an animal constraining line such as a horse cross-tie or a dog leash wherein one end of the line is attached to the animal and the other end is constrained.

2. Related Art

It is known to incorporate various quick release mechanisms into devices used to constrain or handle animals. Quick release mechanisms currently in use include biased latch-type mechanisms which can easily become corroded or contaminated by moisture, dirt, and debris, thereby making their operation unreliable.

One type of release which does not include a biasing member, pivoting member, or camming-action member is a "three-ring" type release which is of a type used in the parachute art. However, to the best of Applicant's knowledge, an animal constraint or handling device effectively able to incorporate such a release has yet to be developed.

Specific restraints or handling devices which could benefit from a more reliable quick release mechanism include cross-ties and dog leashes.

As regards dog leashes, the handlers of guard dogs, attack dogs and the like (e.g., security personnel) generally constrain the dogs by holding onto a leash attached to a dog's harness, collar, etc. There may come a time when it is necessary to release the dog as rapidly as possible. In such an event, the need for the handler to manipulate a buckle or clip holding the leash to the collar or harness is time consuming, especially if the dog is straining at the leash and moving about. Also, it may be necessary for the handler to put down objects that he/she is carrying, such as a weapon or flashlight, or take his/her eyes from a subject, thereby placing the handler at a disadvantage. Moreover, when it later becomes necessary to reattach the dog to the leash, the handler may again be placed at a disadvantage if the reattachment process is difficult.

Quick release dog leashes that can be remotely operated are disclosed, for example, in U.S. Pat. No. 5,125,365 and 4,149,492. However, these mechanisms tend to be of complicated construction, e.g., they may require springs, pivots, and/or cams, and are thereby expensive and prone to contamination and corrosion.

As regards cross-ties, such devices are used to restrain horses wherein one end of a cross-tie is attached to a harness or the like, and another end is held, e.g., by being attached to a fixed object. It may occur that it is desirable to release the horse as rapidly as possible if the horse has lost its balance or otherwise put itself in a precarious position.

U.S. Pat. No. 962,890 to Byrd et al. discloses a harness for controlling animals. A release mechanism is provided for the "operable ropes" of the restraint. The release is located along the lower side area of the animal, which is relatively difficult to access when the animal is standing. The release is activated by pressing a thumb piece, which requires the handler to position himself close to the animal in order to activate the release mechanism, thereby increasing the danger the handler will be kicked or otherwise harmed by the animal. Also, the release utilizes spring-biased mechanical parts which are susceptible to contamination, corrosion, and subsequent failure as noted above.

U.S. Pat. No. 5,197,410 to Wilson et al. discloses a releasable tether having a hook-shaped end and a spring-biased bolt closing member. The release mechanism includes a cable housed in a plastic tube. One end of the cable is connected to the bolt, the other end is connected to a trigger member. This release mechanism is rather complex, and includes moveable spring-biased parts which are prone to contamination, corrosion, and subsequent failure.

U.S. Pat. No. 5,103,771 to Lee discloses a remotely controlled quick release device. The release can be actuated by electromechanical means or manually by purely mechanical means. The release disclosed in Lee is overly complicated, and includes spring-biased relatively moveable parts that are subject to corrosion and contamination as noted above.

OBJECTS AND SUMMARY

It is an object of the present invention to provide improved quick release animal constraints and handling devices that are simple, reliable, and inexpensive.

It is another object to provide a quick release dog leash which provides a way of quickly re-attaching the leash to a previously released dog.

These and other objects are attained by providing an animal constraint or handling device with a quick release mechanism that is essentially free of any biasing member, pivoting member, or camming-action member.

A cross-tie constructed according to the present invention includes first and second end cross-tie portions connected by a quick release mechanism that is essentially free of any biasing member, pivoting member, or camming-action member.

A plurality of cross-ties constructed according to the present invention each include a quick release mechanism and an associated trigger mechanism which is slidably connected to a respective cross-tie. The plurality of trigger mechanism are connected to each other and form a singular grasping portion, thereby permitting activation of the plurality of quick release mechanisms of the plurality of cross-ties via the singular grasping portion.

SUMMARY OF THE INVENTION

The present invention relates to a lead for constraining an animal, the lead comprising a line having a first end portion adapted to be connected to an animal, and a second end portion adapted to be constrained. The lead further includes a coupler connectable to the animal, and a quick release mechanism for connecting the coupler to the first end portion of the line. The quick release mechanism is essentially free of any biasing member, pivoting member, or camming-action member. The line further includes a trigger member operably slidable relative to, and extending away from, the quick release mechanism. The trigger member is manually graspable at a location spaced from the quick release mechanism, thereby enabling remote actuation of the quick release mechanism.

Preferably, the lead constitutes a dog leash, and the coupler constitutes a first coupler. The lead further comprises a second coupler attached to the line for re-leashing a previously released dog.

That second coupler is preferably held against relative movement to the line by the quick release mechanism.

BRIEF DESCRIPTION OF THE DRAWINGS

The objects and advantages of the invention will become apparent from the following detailed description of the preferred embodiments thereof in connection with the accompanying drawings, in which like numerals designate like elements, and in which.

DETAILED DESCRIPTION OF THE PREFERRED EMBODIMENTS

Figure 1:
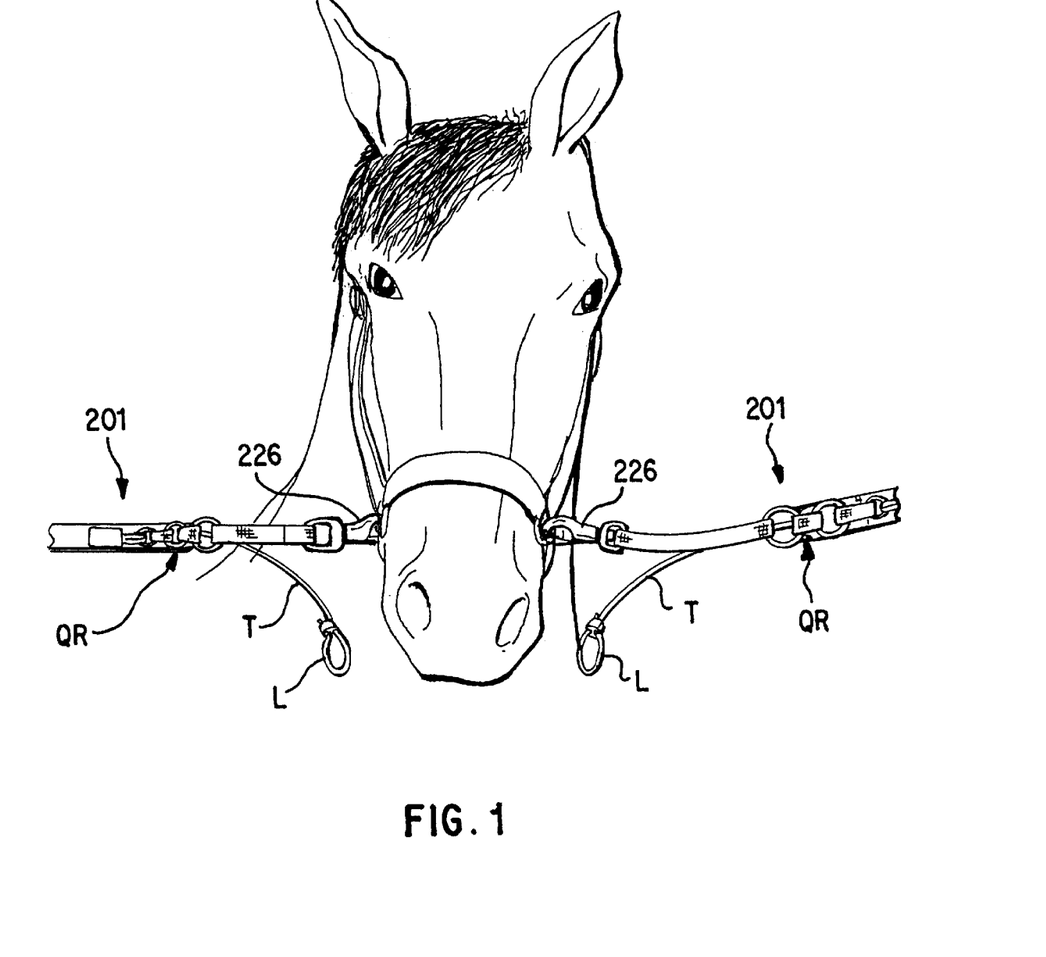
FIG. 1 is an illustration of a cross-tie arrangement constructed in accordance with the principals of the present invention.

FIGS. 1–8 illustrate a first embodiment of the present invention. In this embodiment a cross-tie arrangement incorporating a quick release mechanism constructed according to the principles of the present invention is provided. As illustrated in FIG. 1, at least one cross-tie member 201 is constructed so as to incorporate a quick release mechanism QR embodying the principles of the present invention. Each quick release mechanism QR includes a trigger member T. In the arrangement illustrated in FIG. 1, a plurality of cross-tie members 201 are illustrated, each are provided with a coupler in the form of a releasable clasp member 226 as is common to the art. Each trigger member T is constructed so as to extend from the quick release member QR to a point which is spaced from the quick release member QR and adjacent to the head of the animal and is easily grasped by the handler at such remote location when activating the quick release member QR. The end of the trigger member may be provided with a construction suitable for grasping such a looped end L.

Figure 2:
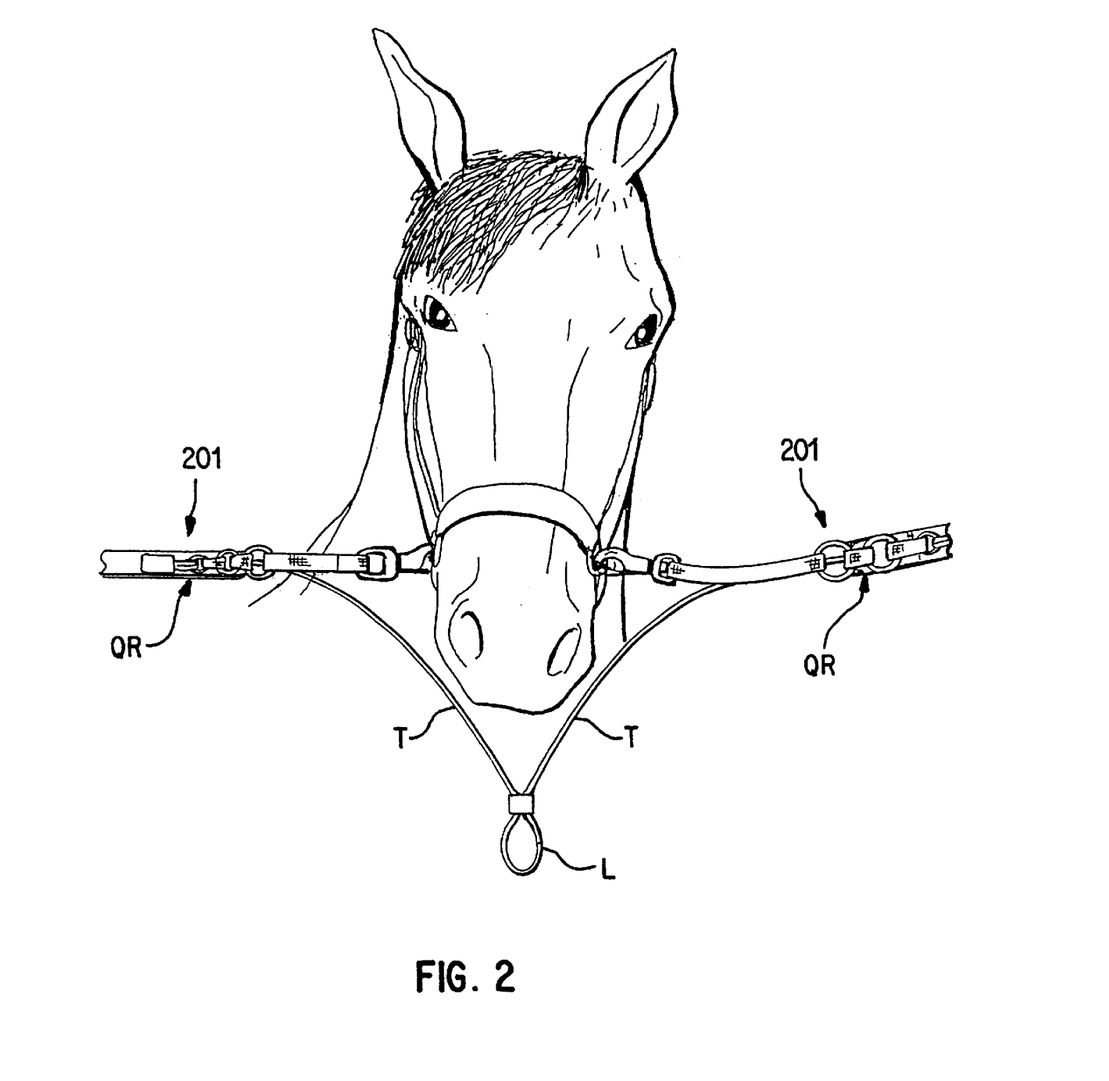
FIG. 2 is an alternative embodiment of the cross-tie arrangement of FIG. 1.

In the modified arrangement illustrated in FIG. 2, a trigger member T of each of a plurality of cross-tie members 201 are interconnected so as to form a common grasping portion of any suitable construction. In the illustrated example, the singular common grasping portion is formed as a looped end L. By this construction the handler can release the plurality of cross-ties simply by grasping the single looped end L and activating each quick release mechanism of the plurality of cross-tie member 201.

Figure 4:
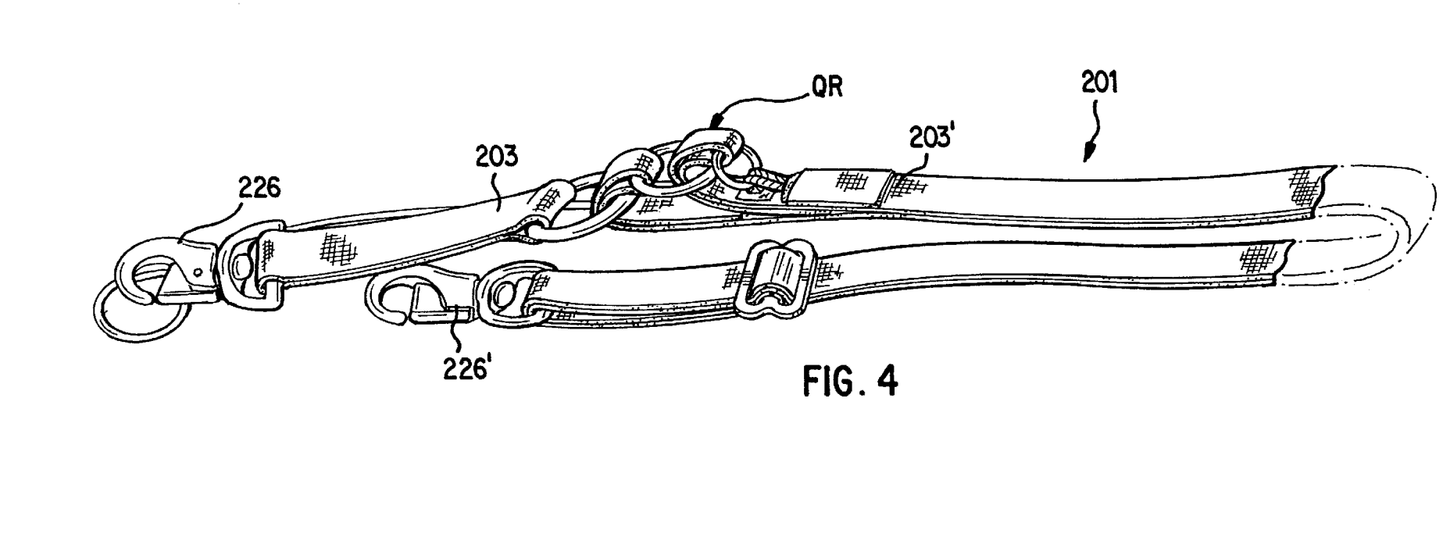
FIG. 4 is a perspective view of a complete cross-tie of FIGS. 1 and 2.

A full cross-tie member 201 constructed according to the principles of the present invention is illustrated in FIG. 4. The cross-tie member 201 generally includes a first and second releasable clasp 226 and 226' disposed at opposite ends of the cross-tie member 201. The clasp 226' is attachable to a stationary support for holding the horse's head still. A first end cross-tie portion 203 and a second end cross-tie portion 203' are releasably connected by a quick release mechanism QR.

Figure 3:
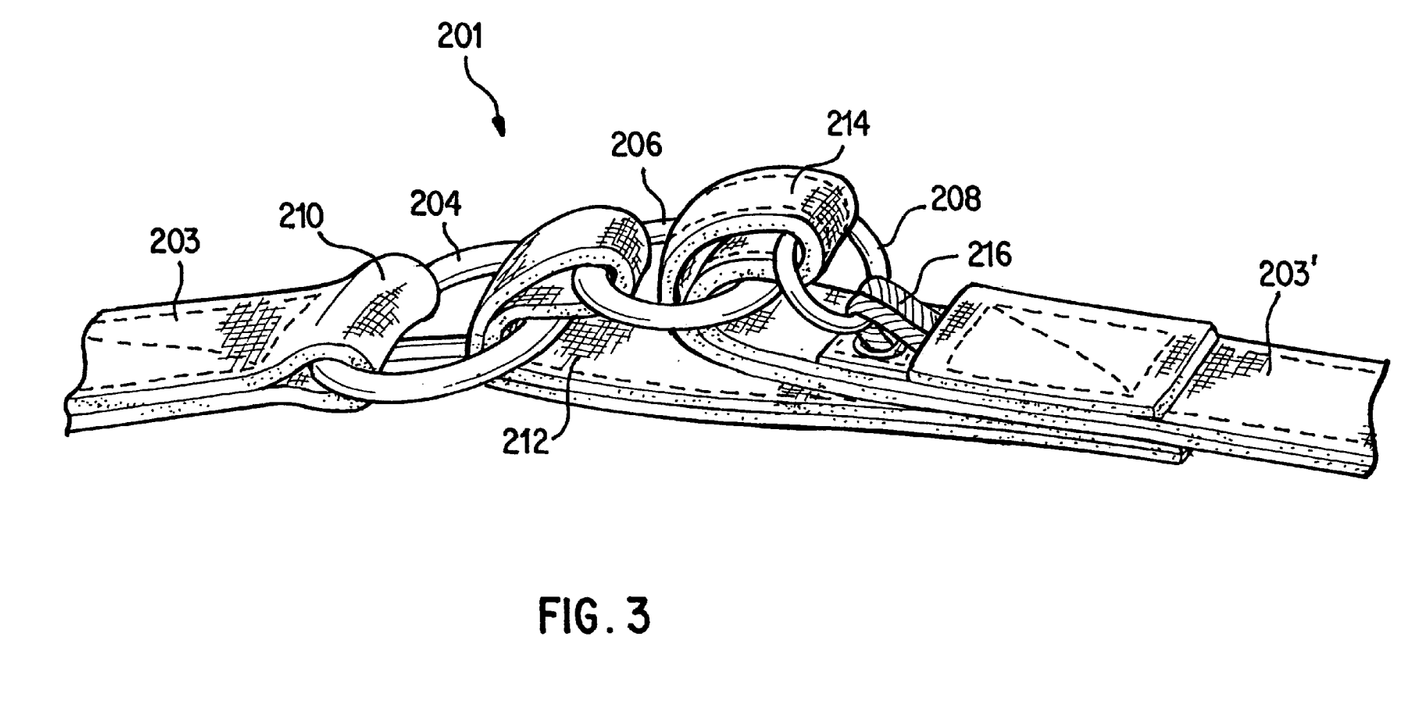
FIG. 3 is a partial perspective view of the quick release mechanism of the cross-tie arrangement of FIGS. 1 and 2.
Figure 5:
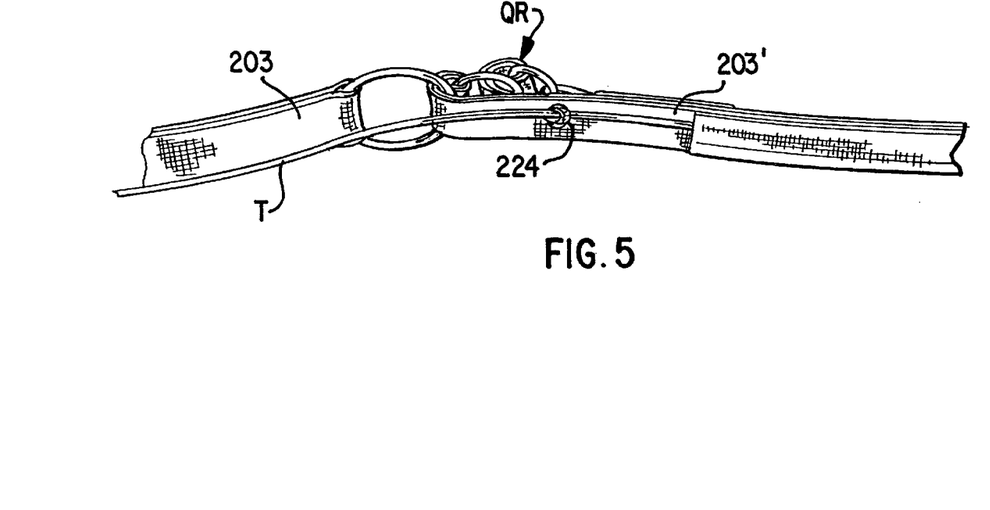
FIG. 5 is a partial bottom perspective view of a cross-tie of FIGS. 1 and 2.

The quick release mechanism QR of this embodiment is best illustrated in FIGS. 3–5.

The cross-tie 201, which may be constructed in any suitable fashion from any acceptable material, has a first and second end cross-tie portions 203, 203' which are connected in a releasable manner by the quick release mechanism QR. The first and second end cross-tie portions 203 and 203' may be looped or have loop shaped members attached thereto. The quick release mechanism QR includes a first large ring 204 attached to the first end cross-tie portion 203 by a first connector 10. A second mid-size ring 206 is attached to the second end rope portion 203' by a second connector 212. And a third small ring 208 is connected to the second end rope portion 203' by a third connector 214. A release member 216 is also attached to the second rope portion to 203'.

The first large ring 204 and the second mid-size ring 206 are sized relative to each other such that the second mid-size ring 206 can pass freely through the opening in the first large ring 204. The second mid-size ring 206 and the third small ring 208 are sized relative to each other such that the third small ring 208 can pass freely through the opening in the second mid-size ring 206.

In a connected state the second connector 212 is looped through the first large ring 204. The third connector 214 is looped through the second mid-size ring 206 and the release member 216 has a free end which is looped through the third small ring 208 and passes through an opening 218 in the second connector and an opening 220 in the third connector 214.

The trigger member T passes through an opening 222 in the free end of the release member 216 and is slidably attached to the cross-tie 201 in any suitable manner. By way of example, a pocket 224 may be provided either within the cross-tie member or attached to an outer surface thereof to slidably receive the trigger T. As illustrated, for example, in FIGS. 1 and 2 the trigger member T is provided with an end portion suitable for grasping. This end may take any suitable form such as a loop L.

Figure 6:
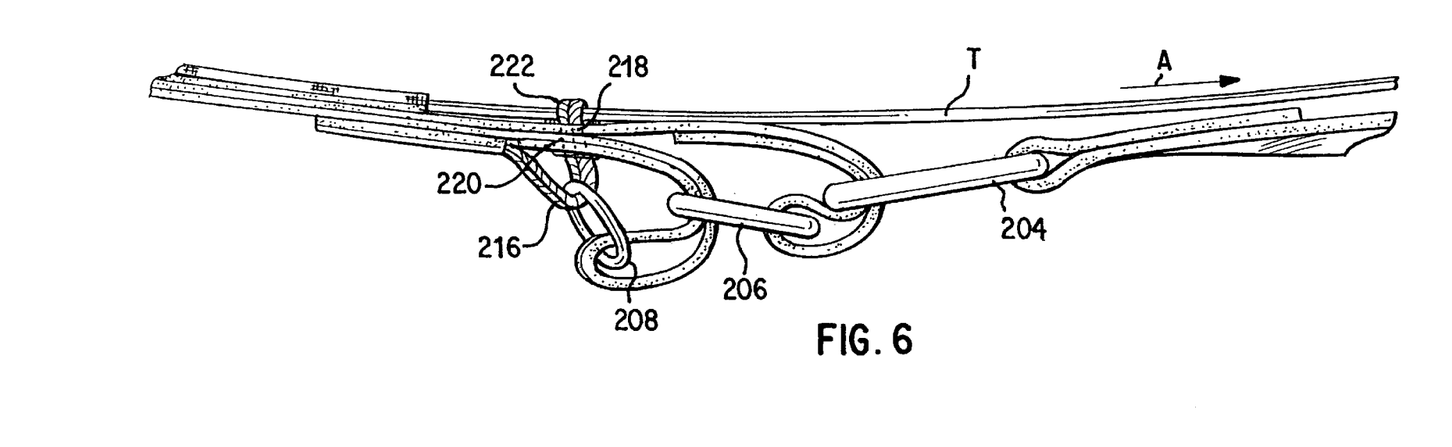
FIG. 6 is a partial side view of the quick release mechanism of the cross-tie of FIGS. 1 and 2 shown just prior to activation.
Figure 7:
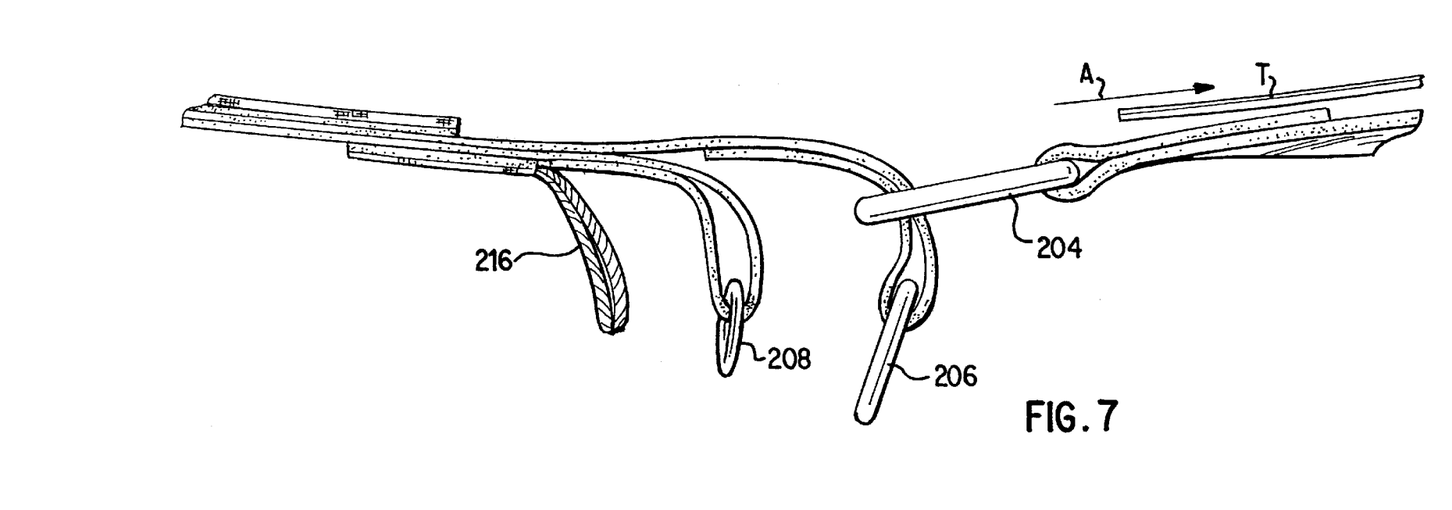
FIG. 7 is a partial side view of the quick release mechanism of FIGS. 1 and 2 shown in a partially activated condition.
Figure 8:
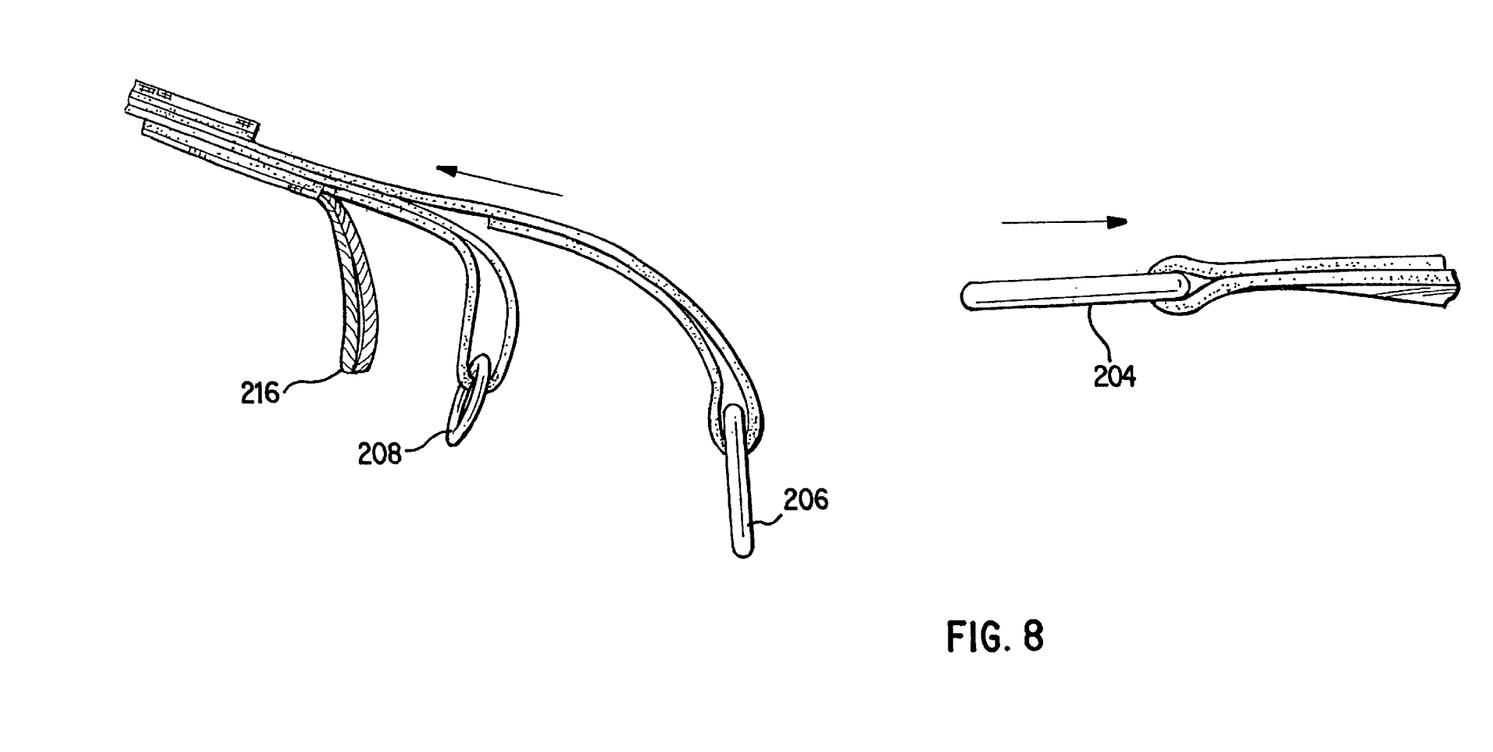
FIG. 8 is a partial side view of the quick release mechanism of FIGS. 1 and 2 shown in a fully activated condition.
Figure 9:
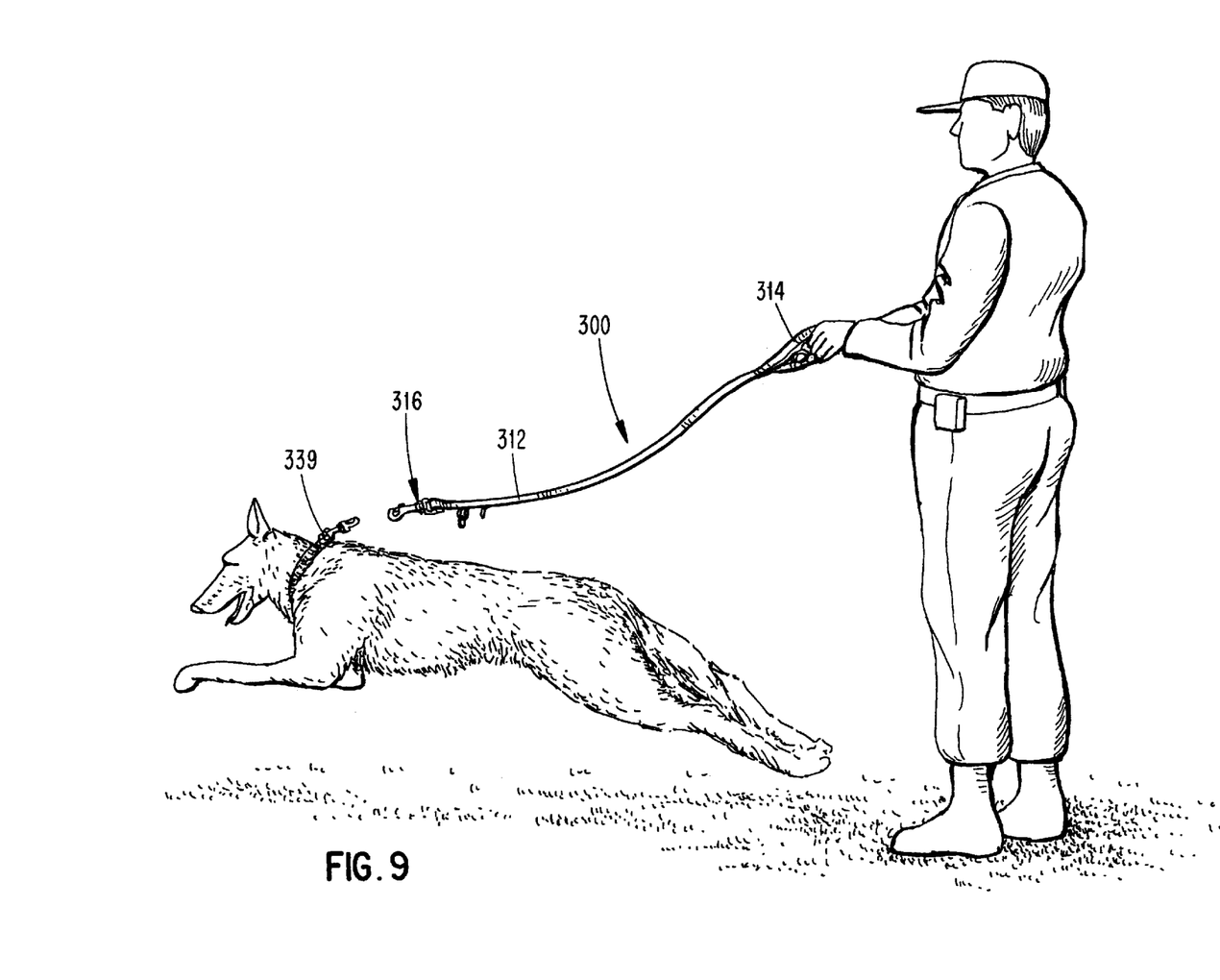
FIG. 9 is a view of a dog leash aspect of the present invention as a quick release mechanism on the dog leash is being released to free the dog.
Figure 10:
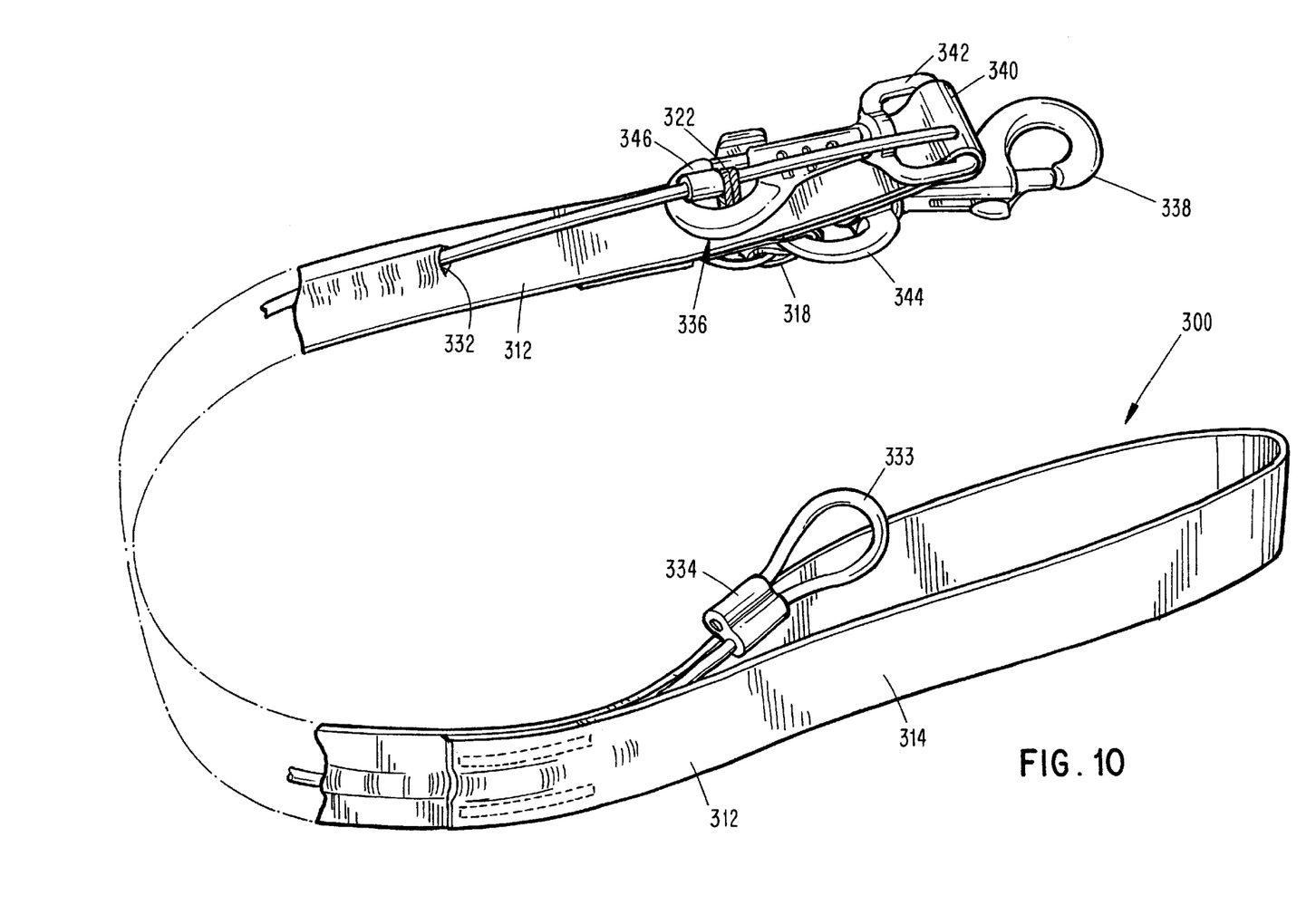
FIG. 10 is a perspective view of the dog leash depicted in FIG. 9, with the quick release mechanism in a secured state.

Activation of the quick release mechanism QR will now be more fully described by reference to FIGS. 6–8.

Trigger member T is pulled in the direction of arrow A and slid out of pocket 224 and through the opening 222 in the free end of the release member 216. As illustrated in FIG. 21, once the trigger member T has been fully removed from the pocket 224 and is completely withdrawn through the opening 222 in the release member 216, the release member 216 is pulled through opening 218 in the second connector 212 and the opening 220 and the third connector 214 by tension applied to the first and second end rope portions 203 and 203'. The third small ring 208 is now freed and passes through the opening in the second mid-size ring 206. Once the small ring 208 has been pulled through the opening in the second mid-size ring 206, the second mid-size ring 206 is now freed and is pulled through the opening in the first large ring 204. Once the second mid-size ring 206 has been pulled through the opening in the first large ring 204, the quick release QR is fully activated and the releasable connection formed between the first and second end rope portions 203 and 203' is now broken. As previously noted, the quick release mechanism QR is constructed without the use of any bias member, pivoting member or camming-action member, thereby providing increased resistance to corrosion and contamination which can adversely affect the reliability and operation of the quick release.

Trigger member T can be of any suitable construction. For example, trigger member T can be a flexible strip, e.g., constructed of a hollow plastic tube.

Figure 11:
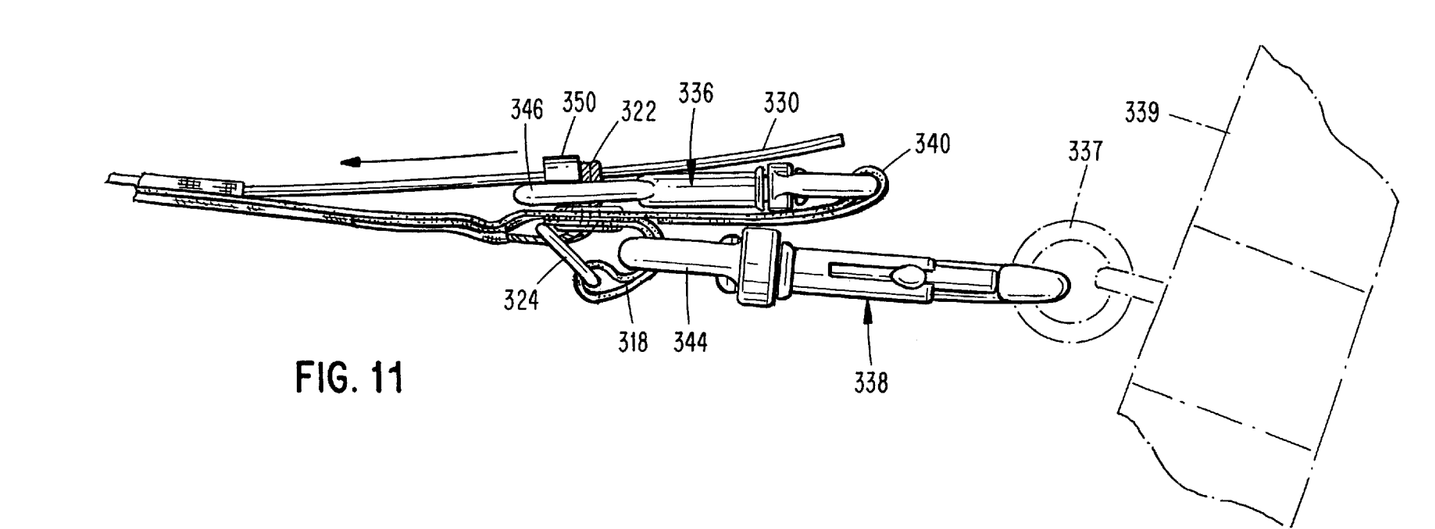
FIG. 11 is a side elevation view of a free end of the leash shown in FIG. 10.

Depicted in FIGS. 9–12 is a quick release dog leash 300 according to the present invention. The leash 300 includes an elongated line 312 such as a strap, chain, etc., that has a handle 314 at one end for enabling a handler to hold the leash and constrain the dog. The opposite end of the line contains a quick release mechanism 316. That mechanism includes a loop-shaped connector 318 that is attached to the line, e.g., by a hollow grommet 320. A loop-shaped release member 322 is also attached to the line, e.g., by stitching. A metal ring 324 is captured by the connector 318. The release member 322 is sized to be able to pass though the ring 324 and also through the grommet 320, whereby an end of the release member 322 protrudes from an opposite side of the line. That protruding end is adapted to be releasably held in that state by one end of a trigger member 330 which passes through the release member 322, as shown in FIG. 11.

Figure 12:
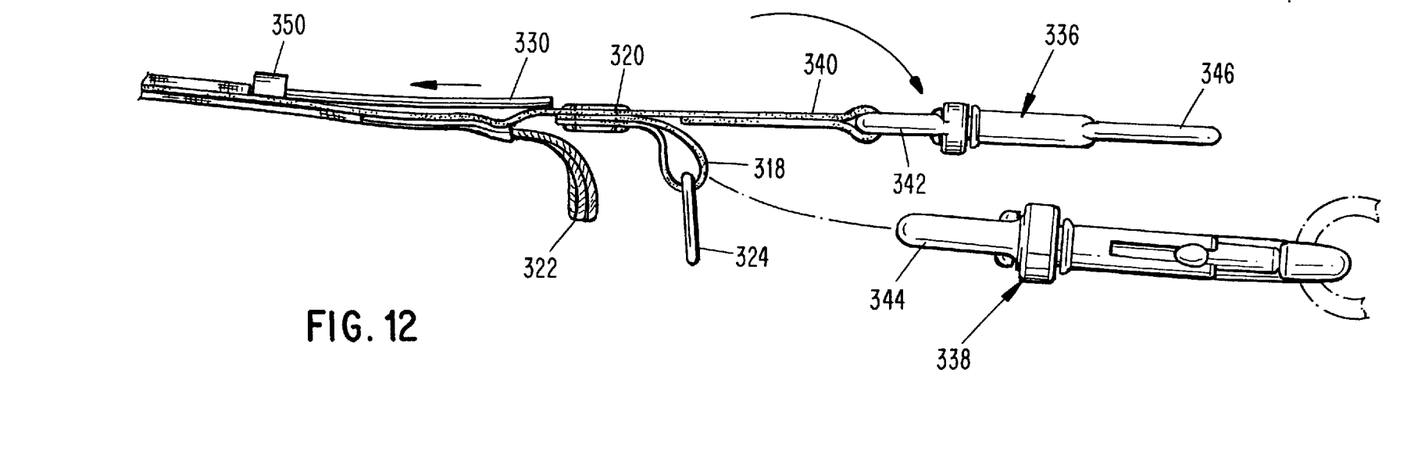
FIG. 12 is a view similar to FIG. 11 after the quick release mechanism has been released to free the dog.

The trigger member 330 passes slidably through a passage defined by a channel 332 formed in the line and emerges from the channel at a location disposed adjacent the handle 314. That emerging end is formed into a loop 333 by a crimped fastener 334. By pulling on (i.e., retracting) the trigger member 330, the release member 322 can be displaced back through the grommet 320 to release the connector 318, as shown in FIG. 12.

A pair of couplers in the form of clasp members 336, 338 of conventional configuration is provided, each clasp member having a manual catch to enable the clasp member to be attached to a ring 337 of a dog's collar or harness 339. One of the clasp members 336 is permanently attached to the line, e.g., by a stitched loop 340 attached to a ring 342 of the clasp member 336, whereas the other clasp member 338 is releasably attached by the release member 322. That is, the clasp member 338 includes a ring 344 through which the connector member 318 can be extended before the connector member 318 is secured to the release member 322.

Furthermore, the release member 322 can be extended through the clasp portion 346 of the clasp member 336, whereby the permanently attached clasp member 336 can be held immovably to the line 312, i.e., without being able to swing and collide with the releasable clasp member 338.

The trigger member is provided with a crimped-on stop member 350 which is able to rest within the clasp portion 346 of the permanently attached clasp member 336 and thereby provide a slight amount of resistance to the sliding of the trigger member 330 in a release direction, for opposing accidental releases.

In use, the clasp member 338 is releasably connected to the release member 322 which is first passed through the ring 324, the grommet 320, and the permanent clasp member 338 before having the trigger member 330 extended therethrough to hold the release member against movement back through the grommet 320 (see FIG. 11). The clasp portion 346 is attached to a dog's collar or harness 339. The handler constrains the dog by grasping the handle 314.

If it becomes necessary to quickly release the dog, the handler merely pulls on the loop 333 of the trigger member 330, thereby sliding the trigger member through and out of the release member 322. The force of the dog pulling against the clasp member 338 causes the clasp member 338 to pull itself free of the release member 322, enabling the dog to pursue its quarry (see FIG. 9).

This release of the dog can take place in an easy manner by a simple, low-cost arrangement that is not susceptible to corrosion or contamination.

When it is necessary to re-attach the leash to the dog, this can be done by means of the permanent clasp member 336, one end of which was freed when the dog was released. Thus, the dog can be re-leashed without the handler being encumbered by the need to re-connect the quick release device.

The leash line can be formed of any suitable material, although a fabric strap is preferred. The clasp members 336, 338 and the ring 324 are preferably formed of metal. The release member 322 is preferably formed of fabric, and the trigger member 330 preferably comprises a relatively stiff hollow plastic tube.

Only preferred embodiments are specifically illustrated and described herein. It should be appreciated that numerous modifications and variations of the present invention are possible in light of the disclosure, such modifications and variations being encompassed within the scope of the appended claims without departing from the spirit and scope of the present invention.

What is claimed is:

1. A lead for constraining an animal comprising:
    a line having a first end portion adapted to be connected to an animal, and a
    second end portion adapted to be constrained;
    a coupler connectable to the animal;
    a quick release mechanism for connecting the coupler to the first end portion of the line, the quick release mechanism being essentially free of any biasing member, pivoting member, or camming-action member; and
    a trigger member operably slidable relative to, and extending away from, the quick release mechanism, the trigger member being manually graspable at a location spaced from the quick release mechanism, thereby enabling remote actuation of the quick release mechanism, the trigger member comprising a flexible strip passing slidably through a passage carried by the line.

2. The lead according to claim 1 wherein the lead constitutes a horse cross tie.

3. The lead according to claim 1, wherein the lead constitutes a dog leash.

4. The lead according to claim 3, wherein the coupler constitutes a first coupler, the lead further comprising a second coupler attached to the line for re-leashing a previously released animal without reconnecting the first coupler to the line.

5. The lead according to claim 4, wherein the quick release mechanism is arranged, prior to be released, to hold the second coupler against movement relative to the line.

6. A dog leash comprising:
a line having a first end portion adapted to be connected to a dog, and a second end portion adapted to be manually held, for constraining the dog;
a coupler connectable to the dog;
a quick release mechanism for connecting the coupler to the first end portion of the line, the quick release mechanism being essentially free of any biasing member, pivoting member or camming-action member; and
a trigger member operably slidable relative to, and extending away from, the release mechanism, the trigger member being graspable at a location adjacent the second end portion of the line, thereby enabling remote actuation of the quick release mechanism, the trigger member comprising a flexible strip passing slidably through a passage carried by the line.

7. The dog leash according to claim 6 wherein the coupler constitutes a first coupler, the leash further comprising a second coupler permanently attached to the line for attaching the first end portion of the line to a dog.

8. The dog leash according to claim 7 wherein the quick release mechanism is arranged, prior to being released, to hold the second coupler against movement relative to the line.

9. The dog leash according to claim 6 wherein the quick release mechanism comprises a loop member fixed to the line by a grommet and including a first ring attached to a free end of the loop member, and a loop-shaped release member fixed to the line adjacent to a first side of the grommet, the release member being insertable sequentially through the first ring and the grommet to be exposed on a second side of the grommet and secured thereat by the trigger member, the first loop member being securable to a second ring of the coupler to secure the coupler to the line as long as the release member is secured by the trigger member.

10. The dog leash according to claim 9 wherein the coupler comprises a first coupler, the dog leash further comprising a second coupler attached to the line adjacent the first end thereof for releashing a previously-released dog.

11. The dog leash according to claim 10 wherein the second coupler is attached at a first end thereof to the line, the release member passing through a second end of the second coupler to hold the second coupler against movement relative to the line as long as the release member is secured by the trigger member.

12. The dog leash according to claim 6 wherein the trigger member comprises a plastic tube passing through the passage, the passage comprising a channel formed in the line.

13. A lead for constraining an animal comprising:
a line having a first end portion adapted to be connected to an animal, and a second end portion adapted to be constrained;
a first coupler connectable to the animal;
a quick release mechanism for connecting the first coupler to the first end portion of the line;
a trigger member operably slidable relative to, and extending away from, the quick release mechanism, the trigger member being manually graspable at a location spaced from the quick release mechanism, thereby enabling remote actuation of the quick release mechanism; and
a second coupler attached to the line for re-leashing a previously released animal without reconnecting the first coupler to the line.

14. The lead according to claim 13, wherein the quick release mechanism is arranged, prior to being released, to hold the second coupler against movement relative to the line.

15. A lead for constraining an animal comprising:
a line having a first end portion adapted to be connected to an animal, and a second end portion adapted to be constrained;
a coupler connectable to the animal;
a quick release mechanism for connecting the coupler to the first end portion of the line, the quick release mechanism being essentially free of any biasing member, pivoting member, or camming-action member; and
a trigger member operably slidable relative to, and extending away from, the quick release mechanism, the trigger member being manually graspable at a location spaced from the quick release mechanism, thereby enabling remote actuation of the quick release mechanism;
wherein the lead constitutes a horse cross tie.

16. A lead for constraining an animal comprising:
a line having a first end portion adapted to be connected to an animal, and a
second end portion adapted to be constrained;
a coupler connectable to the animal;
a quick release mechanism for connecting the coupler to the first end portion of the line, the quick release mechanism being essentially free of any biasing member, pivoting member, or camming-action member; and
a trigger member operably slidable relative to, and extending away from, the quick release mechanism, the trigger member being manually graspable at a location spaced from the quick release mechanism, thereby enabling remote actuation of the quick release mechanism;
wherein the lead constitutes a dog leash, and the coupler constitutes a first coupler, the lead further comprising a second coupler attached to the line for re-leashing a previously released dog.

17. A dog leash comprising:
a line having a first end portion adapted to be connected to a dog, and a second end portion adapted to be manually held, for constraining the dog;
a coupler connectable to the dog;
a quick release mechanism for connecting the coupler to the first end portion of the line, the quick release mechanism being essentially free of any biasing member, pivoting member or camming-action member; and
a trigger member operably slidable relative to, and extending away from, the release mechanism, the trigger member being graspable at a location adjacent the second end portion of the line, thereby enabling remote actuation of the quick release mechanism;
wherein the coupler constitutes a first coupler, the leash further comprising a second coupler permanently attached to the line for attaching the first end portion of the line to a dog.

18. A dog leash comprising:
a line having a first end portion adapted to be connected to a dog, and a second end portion adapted to be manually held, for constraining the dog;

a coupler connectable to the dog;

a quick release mechanism for connecting the coupler to the first end portion of the line, the quick release mechanism being essentially free of any biasing member, pivoting member or camming-action member; and a trigger member operably slidable relative to, and extending away from, the release mechanism, the trigger member being graspable at a location adjacent the second end portion of the line, thereby enabling remote actuation of the quick release mechanism;

wherein the quick release mechanism comprises a loop member fixed to the line by a grommet and including a first ring attached to a free end of the loop member, and a loop-shaped release member fixed to the line adjacent to a first side of the grommet, the release member being insertable sequentially through the first ring and the grommet to be exposed on a second side of the grommet and secured thereat by the trigger member, the first loop member being securable to a second ring of the coupler to secure the coupler to the line as long as the release member is secured by the trigger member.

19. A dog leash comprising:

a line having a first end portion adapted to be connected to a dog, and a second end portion adapted to be manually held, for constraining the dog;

a coupler connectable to the dog;

a quick release mechanism for connecting the coupler to the first end portion of the line, the quick release mechanism being essentially free of any biasing member, pivoting member or camming-action member; and a trigger member operably slidable relative to, and extending away from, the release mechanism, the trigger member being graspable at a location adjacent the second end portion of the line, thereby enabling remote actuation of the quick release mechanism;

wherein the trigger member comprises a plastic tube passing through a passage formed in the line.

* * * * *